United States Patent
Niu et al.

(10) Patent No.: US 12,511,576 B1
(45) Date of Patent: Dec. 30, 2025

(54) CORRECTING TIME SERIES PREDICTIONS FOR SEASONALITY WITH TRENDS

(71) Applicant: Amazon Technologies, Inc., Seattle, WA (US)

(72) Inventors: Wei Niu, Bellevue, WA (US); Spyridon Garyfallos, Seattle, WA (US); Vinay Kale, Seattle, WA (US); Jing Zhang, Seattle, WA (US); Thomas Boyd Johnston, Seattle, WA (US); Tak Chung Lung, Bellevue, WA (US)

(73) Assignee: Amazon Technologies, Inc., Seattle, WA (US)

( * ) Notice: Subject to any disclaimer, the term of this patent is extended or adjusted under 35 U.S.C. 154(b) by 945 days.

(21) Appl. No.: 17/710,510

(22) Filed: Mar. 31, 2022

(51) Int. Cl.
*G06N 20/00* (2019.01)
*G06Q 30/0202* (2023.01)

(52) U.S. Cl.
CPC ......... *G06N 20/00* (2019.01); *G06Q 30/0202* (2013.01)

(58) Field of Classification Search
CPC .......................... G06N 20/00; G06Q 30/0202
See application file for complete search history.

(56) References Cited

U.S. PATENT DOCUMENTS

| 7,987,106 | B1 | 7/2011 | Aykin |
| 8,200,454 | B2 | 6/2012 | Dorneich et al. |
| 10,198,339 | B2 | 2/2019 | Salunke et al. |
| 10,474,968 | B2 | 11/2019 | Chien et al. |
| 10,715,393 | B1 * | 7/2020 | Madhavan ............... H04L 41/16 |
| 11,250,449 | B1 | 2/2022 | Bledsoe et al. |
| 12,079,304 | B1 * | 9/2024 | Mishra ..................... G06F 17/18 |
| 2014/0344226 | A1 * | 11/2014 | Rastogi .............. G06Q 30/0202 707/691 |
| 2017/0262900 | A1 * | 9/2017 | Ramachandran ...... G06N 20/00 |
| 2018/0300737 | A1 * | 10/2018 | Bledsoe ........... G06Q 10/06395 |
| 2021/0012191 | A1 * | 1/2021 | Qiao ....................... G06N 3/044 |
| 2022/0172038 | A1 * | 6/2022 | Chen ....................... G06N 3/045 |
| 2022/0180207 | A1 * | 6/2022 | Liang ...................... G06N 3/045 |
| 2022/0245526 | A1 * | 8/2022 | Banubakode ............ G06N 7/01 |
| 2022/0368709 | A1 * | 11/2022 | Kaye ................... H04L 63/1425 |
| 2023/0028574 | A1 * | 1/2023 | Han .................... H04L 43/0876 |

\* cited by examiner

*Primary Examiner* — David E Choi
(74) *Attorney, Agent, or Firm* — S. Scott Foster; Kowert, Hood, Munyon, Rankin & Goetzel, P.C.

(57) ABSTRACT

Correcting time series predictions for seasonality using trends may be performed. An initial time series prediction for a period of time using a machine learning model trained on a time series may be made. Data of the time series from more than an analysis time period prior to the period of time may be obtained. The time series prediction and the obtained data of the time series may be decomposed in respective components including a trend component. The respective trend component of the obtained data may evaluated to determine whether a trend replacement criteria is satisfied. The respective trend component of the time series prediction may be replaced with a portion corresponding to the period of time in a prior analysis time period from the respective component of the obtained data of the time series to correct the time series prediction for seasonality.

20 Claims, 7 Drawing Sheets

CORRECTING TIME SERIES PREDICTIONS FOR SEASONALITY WITH TRENDS

BACKGROUND

Time series data is generated by many different systems, services, or applications. Logs, for instance, may be time series data that can provide valuable insight into the operational behavior of a system. Given the increasing amounts of time series data that is generated, managed time series prediction systems may be used to coordinate the ingestion, processing, and performance of various analyses or operations based on time series data in a way that provides a scalable capacity to utilize time series data for a source system, service, or application improvement.

Figure 1:
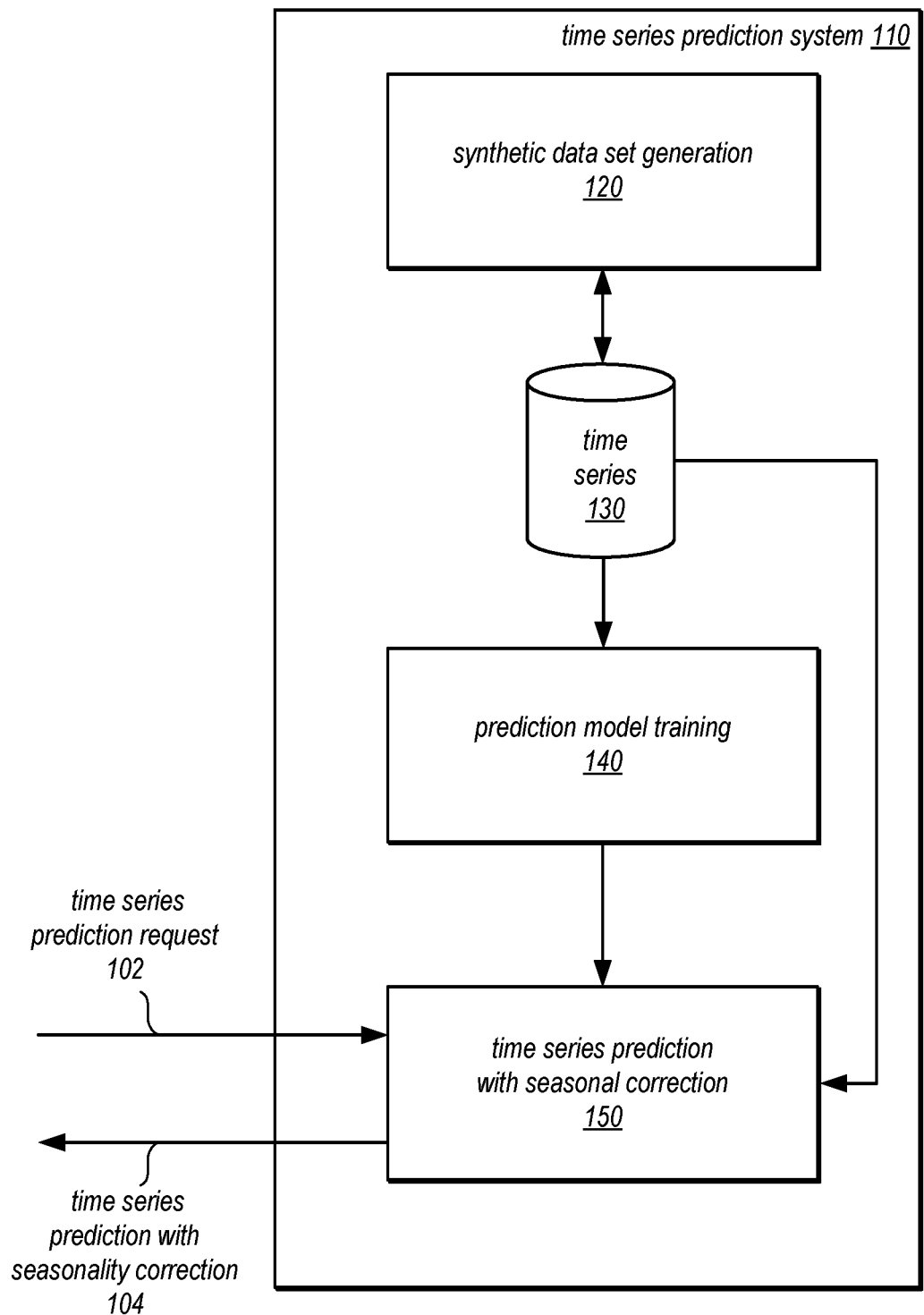
FIG. 1 illustrates a logical block diagram of correcting time series predictions for seasonality with trends, according to some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as described by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

DETAILED DESCRIPTION OF EMBODIMENTS

Various techniques of correcting time series predictions for seasonality with trends are described herein. Time series data, which may describe various actions, events, or other data points corresponding to points in time, may offer valuable insights into the performance of various systems, services, applications, or organizations. One such example of an insight is used for forecasting or otherwise predicting system utilization, operations, or demand. These predictions may be based on machine learning techniques that utilize a machine learning model trained to generate a prediction (e.g., of future time series values) for a time series on which the machine learning model was trained.

Machine learning may refer to a discipline by which computer systems can be trained to recognize patterns through repeated exposure to training data. In unsupervised learning, a self-organizing algorithm learns previously unknown patterns in a data set without any provided labels. In supervised learning, this training data includes an input that is labeled (either automatically, or by a human annotator) with a "ground truth" of the output that corresponds to the input. A portion of the training data set is typically held out of the training process for purposes of evaluating/validating performance of the trained model. The use of a trained model in production is often referred to as "inference," during which the model receives new data that was not in its training data set and provides an output based on its learned parameters. The training and validation process may be repeated periodically or intermittently, by using new training data to refine previously learned parameters of a production model and deploy a new production model for inference, in order to mitigate degradation of model accuracy over time. The application of machine learning models to provide inferences to detect anomalies in time series data may provide performance improvements for anomaly detection systems (e.g., in terms of accuracy and efficiency).

Machine learning models may perform well on time series analysis tasks, such as time series prediction. Although machine learning models, such as deep learning models, have strong predictive capability, it is generally acknowledged that superior performance of these models relies heavily on a large amount of training data to mitigate problems such as overfitting and a larger model that requires even more data to train. However, there exists multiple limiting factors that prevent enough machine learning training data being collected in some scenarios. For example, new client applications, systems, services, or users that wish to utilize time series prediction techniques may have a small or limited amount of historical information to be used for training. In another example, there may be scenarios where regulations, best practices, confidentiality concerns or other guidelines may limit the amount of time series data that can be collected or retained (once collected). Longer horizon forecasts generally pose a higher demand on the quality and quantity of the time series data. Thus, the lack of training data may limit the scenarios in which time series analysis techniques can be implemented.

Figure 6:
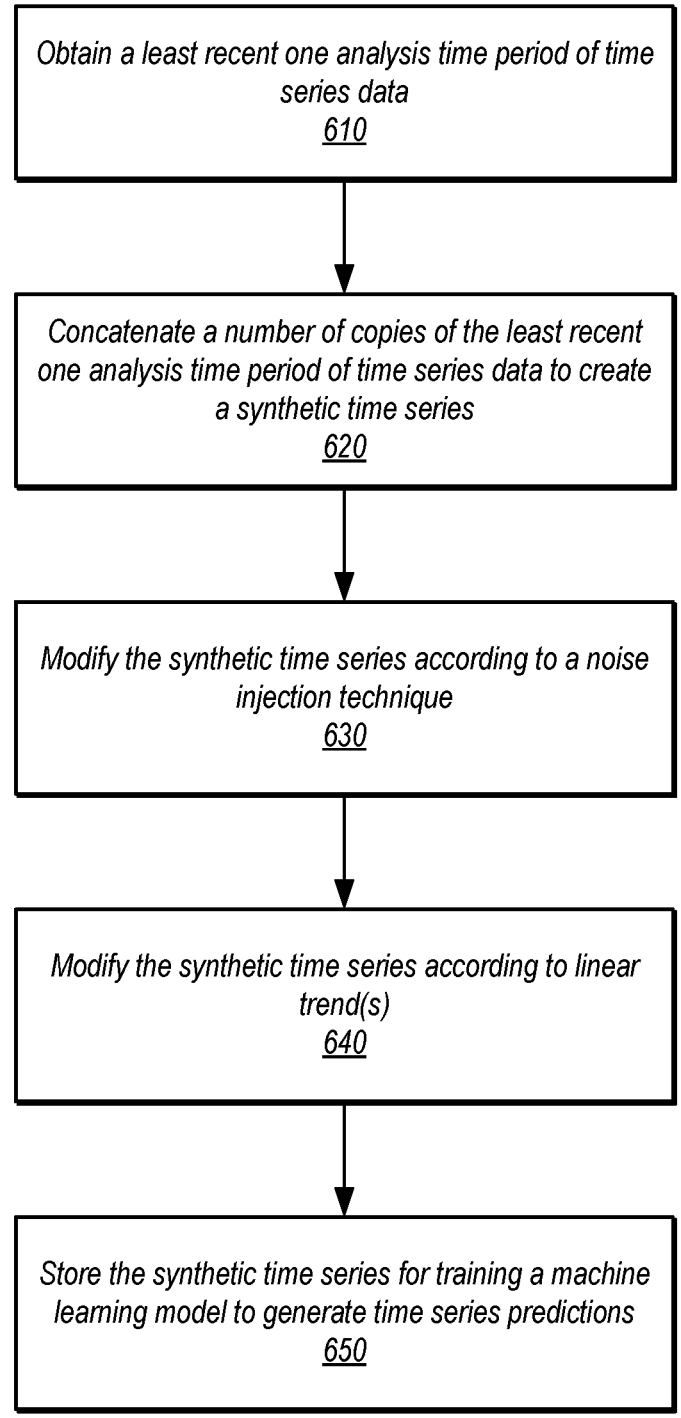
FIG. 6 illustrates a high-level flowchart of various methods and techniques to implement generating a synthetic time series for training a machine learning model for time series predictions, according to some embodiments.

As discussed in detail below with regard to FIGS. 1, 3, and 6, techniques may be implemented in various embodiments to generate synthetic time series data. This synthetic time series data may be used to augment the historical/actual time series data which may, on its own, be insufficient for analysis techniques. In this way, a longer time series may be created that allows for model training techniques that, for example, rely upon a sliding window to perform training.

Another consideration in performing time series analysis tasks, like forecasting, is the ability to identify seasonal behavior in time series data. Seasonality exists in different forms (ex. additive, multiplicative) and at different granularity (yearly, monthly, weekly, daily, etc.) in any given time series and can be difficult to deal with based on underlying problem. For example, the granularity of forecasts can be high (e.g., 15 min intervals) causing a large number of data points in a time series (e.g., 35,000 data points of a time series signal in a year for a 15 minute interval) and it can get hard to catch yearly trend as the data is too granular for a model to focus on. Moreover to address seasonality, existing techniques usually need at least 2 years of data for the time series for the algorithm to pick up on a repeating yearly trend. These considerations may limit the applicability of seasonality analysis. However, as discussed in detail below with regard to FIGS. 1, 4, and 5, techniques for correcting time series predictions for seasonality with trends in an analysis time period may be implemented in various embodiments that deliver robust results even with limited amounts of time series data.

FIG. 1 illustrates a logical block diagram of correcting time series predictions for seasonality with trends, according to some embodiments. Time series prediction system 110 may implement various techniques for performing time series processing tasks, such as generating a time series prediction (e.g., sometimes referred to as a forecast) for various other operations.

Time series prediction system 110 (e.g., computing system 1000 in FIG. 7 or multiple computing systems, such as those that may implement a contact center management service 210 in FIG. 2) may implement an interface to receive a request for a times series prediction, as indicated at 102. Synthetic data set generation 120 may be implemented to produce a time series 130 that can be used to provide this time series prediction according to the techniques discussed below. For example, a seed of historical time series data can be concatenated and modified with noise and linear trends to produce an augmented time series 130. This time series 130 may be used in prediction model training 140 to generate a prediction model, such as a Deep Neural Network (DNN).

The trained model may then be applied by time series prediction 150 with seasonal forecasting 150, which may determine the similarity of prior trends in an analysis time period (e.g., yearly, quarterly, monthly, weekly, etc.) of time series 130 to determine if seasonality correction can be applied. If applicable, time series prediction with seasonal correction 150 may replace a trend component of the prediction with one determined from a decomposition of the time series 130 in a corresponding portion of time from a prior analysis period of time. For example, if the yearly trend component is being replaced, then the yearly trend component of a prior year may be used as the replacement value. This corrected version may also be aligned with the existing time series 130 (using scaling techniques as discussed in detail below) before being provided, as indicated at 104.

Please note that the previous description of a time series prediction system and various requests is a logical illustration and thus is not to be construed as limiting as to the implementation of correcting time series predictions for seasonality with trends.

This specification continues with a general description of a provider network that implements multiple different services, including a contact center management service that may implement tracking status of managed time series processing tasks. Then various examples of the contact center management service, including different components/modules, or arrangements of components/module that may be employed as part of implementing the anomaly detection service are discussed. A number of different methods and techniques to implement tracking status of managed time series processing tasks are then discussed, some of which are illustrated in accompanying flowcharts. Finally, a description of an example computing system upon which the various components, modules, systems, devices, and/or nodes may be implemented is provided. Various examples are provided throughout the specification.

Figure 2:
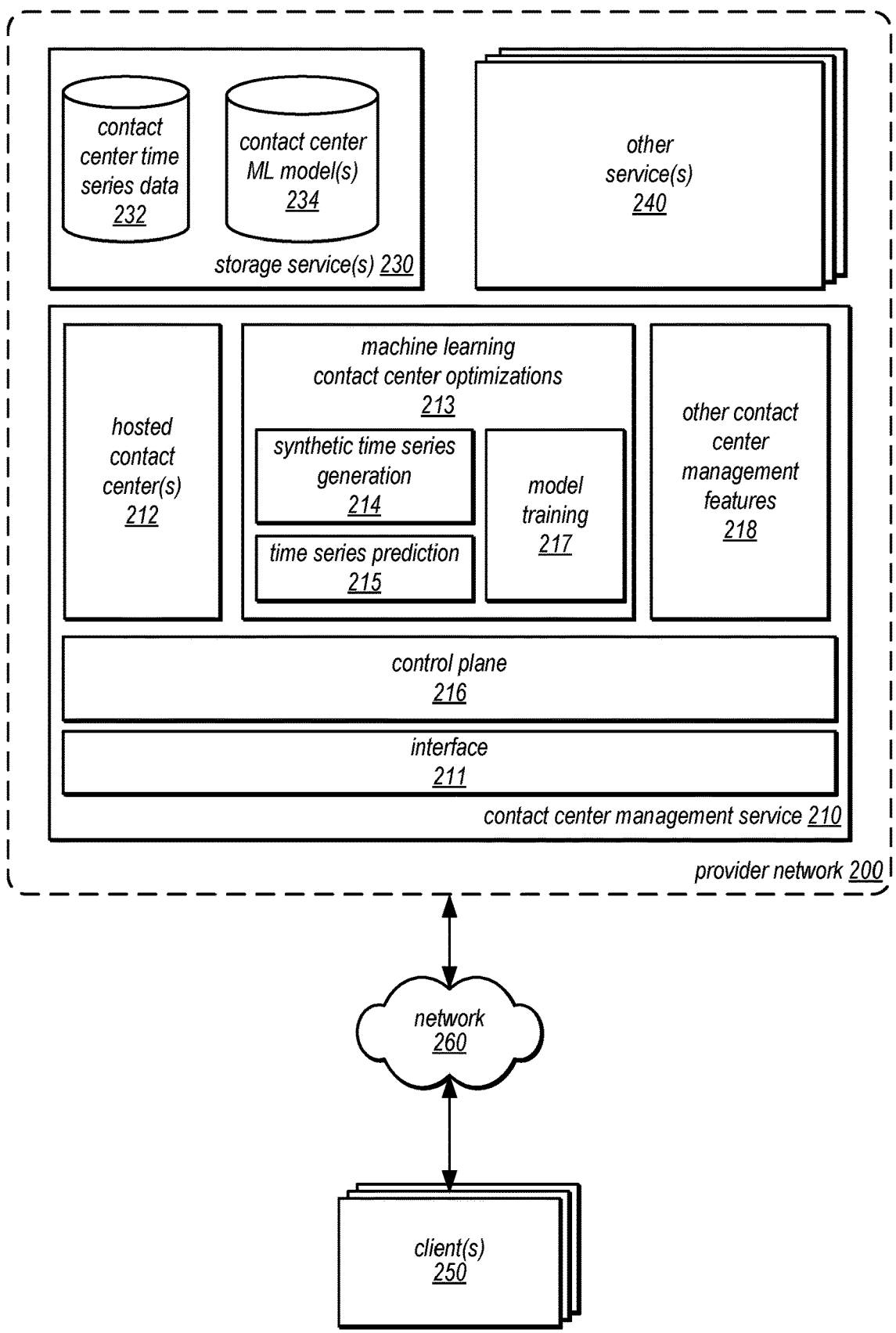
FIG. 2 illustrates an example provider network that may implement a contact management center service that may implement correcting time series predictions for seasonality with trends, according to some embodiments.

FIG. 2 illustrates an example provider network that may implement a contact management center service that may implement correcting time series predictions for seasonality with trends, according to some embodiments. Provider network 200 may be a private or closed system, or may be set up by an entity such as a company or a public sector organization to provide one or more services (such as various types of cloud-based storage) accessible via the Internet and/or other networks to clients 250, in one embodiment. Provider network 200 (which may, in some implementations, be referred to as a "cloud provider network" or simply as a "cloud") refers to a pool of network-accessible computing resources (such as compute, storage, and networking resources, applications, and services), which may be virtualized or bare-metal. Provider network 200 can provide convenient, on-demand network access to a shared pool of configurable computing resources that can be programmatically provisioned and released in response to customer commands. These resources can be dynamically provisioned and reconfigured to adjust to variable load. For example, in some embodiments, provider network 200 may implement various computing resources or services, such as object machine learning model-based search service 210, storage service(s) 230, and/or any other type of network-based services 240 (which may include a virtual compute service and various other types of storage, database or data processing, analysis, communication, event handling, visualization, data cataloging, data ingestion (e.g., ETL), and security services), in some embodiments.

The provider network 200 can be formed as a number of regions, where a region is a separate geographical area in which the cloud provider clusters data centers. Each region can include two or more availability zones connected to one another via a private high speed network, for example a fiber communication connection. An availability zone (also known as an availability domain, or simply a "zone") refers to an isolated failure domain including one or more data center facilities with separate power, separate networking, and separate cooling from those in another availability zone. Preferably, availability zones within a region are positioned far enough away from one other that the same natural disaster should not take more than one availability zone offline at the same time. Customers can connect to availability zones of the provider network 200 via a publicly accessible network (e.g., the Internet, a cellular communication network). Regions are connected to a global network which includes private networking infrastructure (e.g., fiber connections controlled by the cloud provider) connecting each region to at least one other region. The provider network 200 may deliver content from points of presence outside of, but networked with, these regions by way of edge locations and regional edge cache servers. This compartmentalization and geographic distribution of computing hardware enables the provider network 200 to provide low-latency resource access to customers on a global scale with a high degree of fault tolerance and stability.

In various embodiments, the components illustrated in FIG. 2 may be implemented directly within computer hardware, as instructions directly or indirectly executable by computer hardware (e.g., a microprocessor or computer system), or using a combination of these techniques. For example, the components of FIG. 2 may be implemented by a system that includes a number of computing nodes (or simply, nodes), each of which may be similar to the computer system embodiment illustrated in FIG. 7 and described below, in one embodiment. In various embodiments, the functionality of a given system or service component (e.g., a component of machine learning model-based search service 210 may be implemented by a particular node or may be distributed across several nodes. In some embodiments, a given node may implement the functionality of more than one service system component (e.g., more than one data store component).

Contact center management service 210 may implement interface 211 to allow clients (e.g., client(s) 250 or clients implemented internally within provider network 200, such as a client application hosted on another provider network service like an event driven code execution service or virtual compute service) to send request to create or utilize various features of a hosted contact center 212. For example, contact center management service 210 may implement interface 211 (e.g., a graphical user interface, programmatic interface that implements Application Program Interfaces (APIs) and/or a command line interface) may be implemented so that a client can request submit various requests, such as a request to obtain a forecast or other prediction that indicates hosted contact center staffing or other resource needs for a hosted contact center. Such a prediction or forecast may be displayed to provide information in response to the request, such as visualization other representation of the forecast, including predicted information such as predicted call volume and average call handling time for a hosted contact center.

Contact center management service 210 may implement machine learning contact center optimizations 213 to provide various information to users specific to particular hosted contact centers 212, such as the prediction of staffing and other resources for a hosted contact center, as discussed above. These contact center optimizations 213 may include the performance of synthetic time series generation 214, model training 217, and time series prediction 215, as discussed in detail below. While depicted as implemented as part of contact center management service 210, in some embodiments, a machine learning service or other service may be used to perform, for example, model training 217, model hosting to perform time series prediction 215, and/or synthetic time series generation 214.

Contact center management service 210 may implement control plane 216, in various embodiments, to manage and/or orchestrate the performance of various features of contact center management service 210. For example, various workload management, security management, identity management, and/or other control functions may be handled by control plane 216. Dynamic provisioning may be implemented as part of control plane 216 to determine and provision a number of computing resources.

Data storage service(s) 230 may implement different types of data stores for storing, accessing, and managing data on behalf of clients 250 as a network-based service that enables clients 250 to operate a data storage system in a cloud or network computing environment. Data storage service(s) 230 may also include various kinds relational or non-relational databases, in some embodiments, Data storage service(s) 230 may include object or file data stores for putting, updating, and getting data objects or files, in some embodiments. For example, one data storage service 230 may be an object-based data store that allows for different data objects of different formats or types of contact center time series data 232 and contact center ML model(s) 234 stored and provided in response to requests. In at least some embodiments, data storage service(s) 230 may be treated as a data lake. For example, an organization may generate many different kinds of data, stored in one or multiple collections of data objects in a data storage service 230. The data objects in the collection may include related or homogenous data objects, such as database partitions of sales data, as well as unrelated or heterogeneous data objects, such as image data files (e.g., digital photos or video files) audio files and web site log files. Data storage service(s) 230 may be accessed via programmatic interfaces (e.g., APIs) or graphical user interfaces.

Generally speaking, clients 250 may encompass any type of client that can submit network-based requests to provider network 200 via network 260, including requests for time series forecasting service 210 (e.g., a request for task status, etc.). For example, a given client 250 may include a suitable version of a web browser, or may include a plug-in module or other type of code module that can execute as an extension to or within an execution environment provided by a web browser. Alternatively, a client 250 may encompass an application such as an application that may make use of contact center management service 210 to implement various applications. For example, a client 250 may get requested status of different tasks to determine whether to alter various client system operations, such requests may be sent via interface 211. In some embodiments, such an application may include sufficient protocol support (e.g., for a suitable version of Hypertext Transfer Protocol (HTTP)) for generating and processing network-based services requests without necessarily implementing full browser support for all types of network-based data. That is, client 250 may be an application that can interact directly with provider network 200. In some embodiments, client 250 may generate network-based services requests according to a Representational State Transfer (REST)-style network-based services architecture, a document- or message-based network-based services architecture, or another suitable network-based services architecture.

In some embodiments, a client 250 may provide access to provider network 200 to other applications in a manner that is transparent to those applications. Clients 250 may convey network-based services requests (e.g., access requests to read or write data may be via network 260, in one embodiment. In various embodiments, network 260 may encompass any suitable combination of networking hardware and protocols necessary to establish network-based-based communications between clients 250 and provider network 200. For example, network 260 may generally encompass the various telecommunications networks and service providers that collectively implement the Internet. Network 260 may also include private networks such as local area networks (LANs) or wide area networks (WANs) as well as public or private wireless networks, in one embodiment. For example, both a given client 250 and provider network 200 may be respectively provisioned within enterprises having their own internal networks. In such an embodiment, network 260 may include the hardware (e.g., modems, routers, switches, load balancers, proxy servers, etc.) and software (e.g., protocol stacks, accounting software, firewall/security software, etc.) necessary to establish a networking link between given client 250 and the Internet as well as between the Internet and provider network 200. It is noted that in some embodiments, clients 250 may communicate with provider network 200 using a private network rather than the public Internet.

Figure 3:
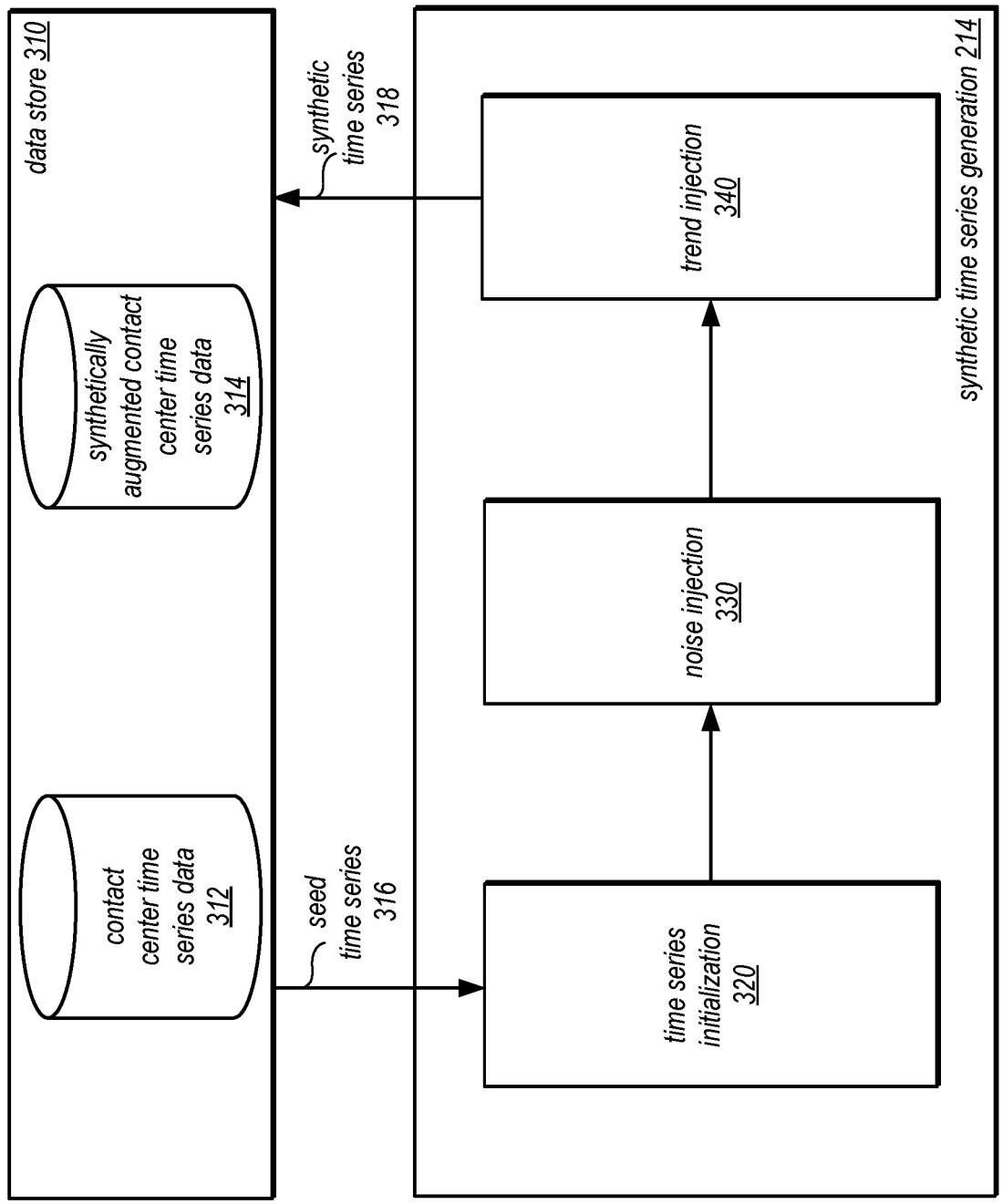
FIG. 3 illustrates a logical block diagram illustrating synthetic data generation, according to some embodiments.

FIG. 3 illustrates a logical block diagram illustrating synthetic data generation, according to some embodiments. Synthetic time series generation 214 may implement the various techniques discussed below with regard to FIG. 6. For example, synthetic time series generation 214 may obtain seed time series data 316 for an analysis period of time (e.g., a year, a quarter, a month, etc.) from contact center time series data 312 in data store 310. Time series initialization 320 may then concatenate a number of copies of the seed time series data. Noise injection 330 may inject noise, such as may be determined according to a noise profile like Gaussian noise or noise profiles, to modify the synthetic time series data. Trend injection 340 may inject one or more linear trends into the synthetic time series data before providing the synthetic time series data 318 to synthetically augmented contact center time series data 314.

Figure 4:
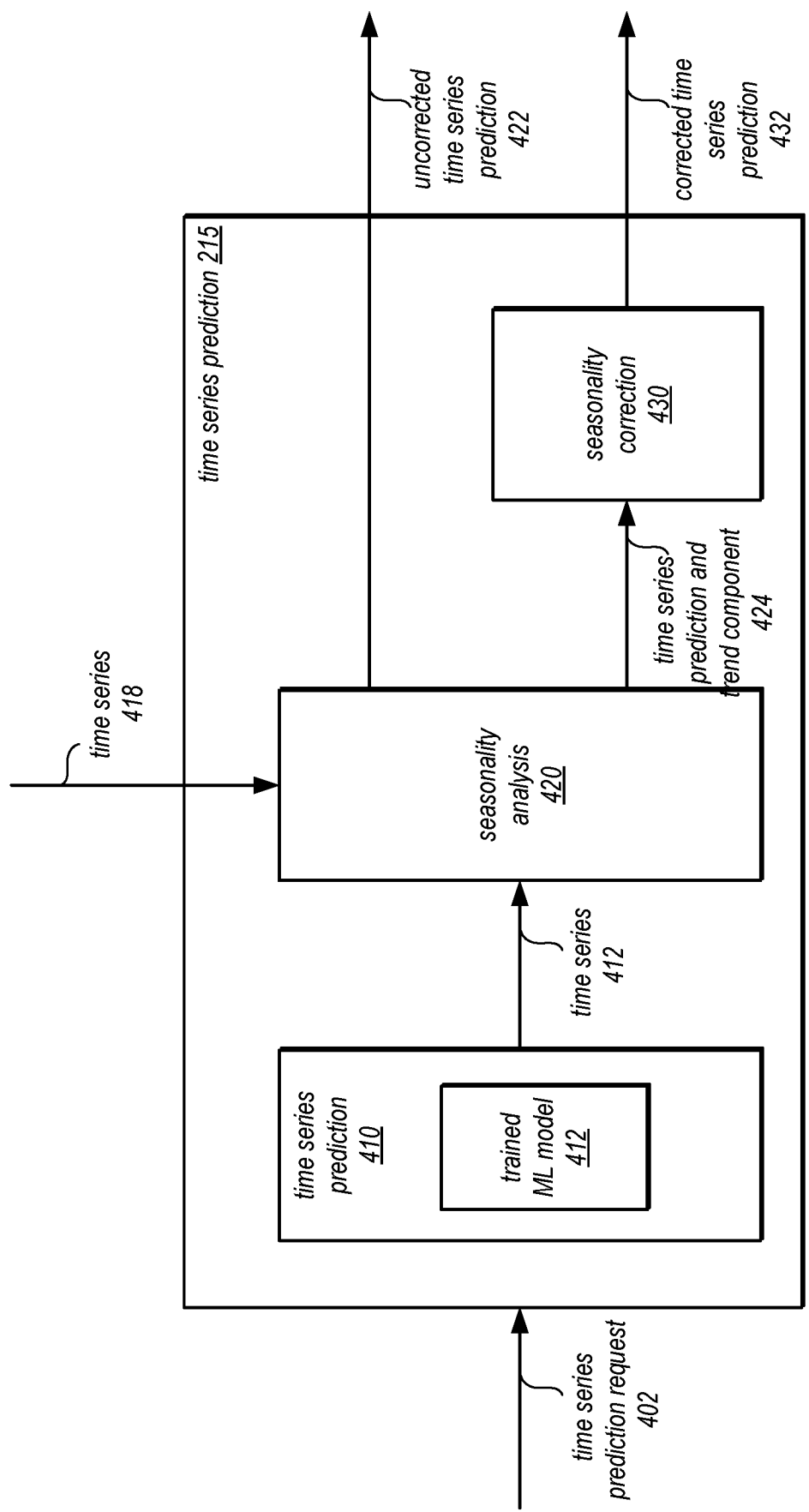
FIG. 4 illustrates a logical block diagram illustrating time series prediction that includes seasonality correction, according to some embodiments.

FIG. 4 illustrates time series prediction that includes seasonality correction, according to some embodiments. Time series prediction 215 may receive a time series prediction request 402. Time series prediction 410 may be implemented to apply a trained ML model 412 that is specific to the contact center being hosted by contact center management service 210. Time series predication 410 may generate the resulting time series prediction 412 and provide it to seasonality analysis 420. As discussed in detail below with regard to FIG. 5, seasonality analysis 420 may determine based on time series data 418 that is obtained (e.g., which may have been used to train the ML model 412) whether seasonality exists such that it should be corrected for in the time series prediction (e.g., by checking for sufficient historical data and for sufficient similarity or correlation to correct for seasonality). If not, then, uncorrected time series prediction 422 may be provided. Seasonality correction 430 may perform trend replacement and alignment as discussed below with regard to FIG. 5 to produce corrected time series prediction 432.

Although FIGS. 2-4 have been described and illustrated in the context of a provider network implementing a contact center management service, the various components illustrated and described in FIGS. 2-4 may be easily applied to other systems that utilize time series predictions. As such, FIGS. 2-4 are not intended to be limiting as to other embodiments of correcting time series predictions for seasonality with yearly trends.

Figure 5:
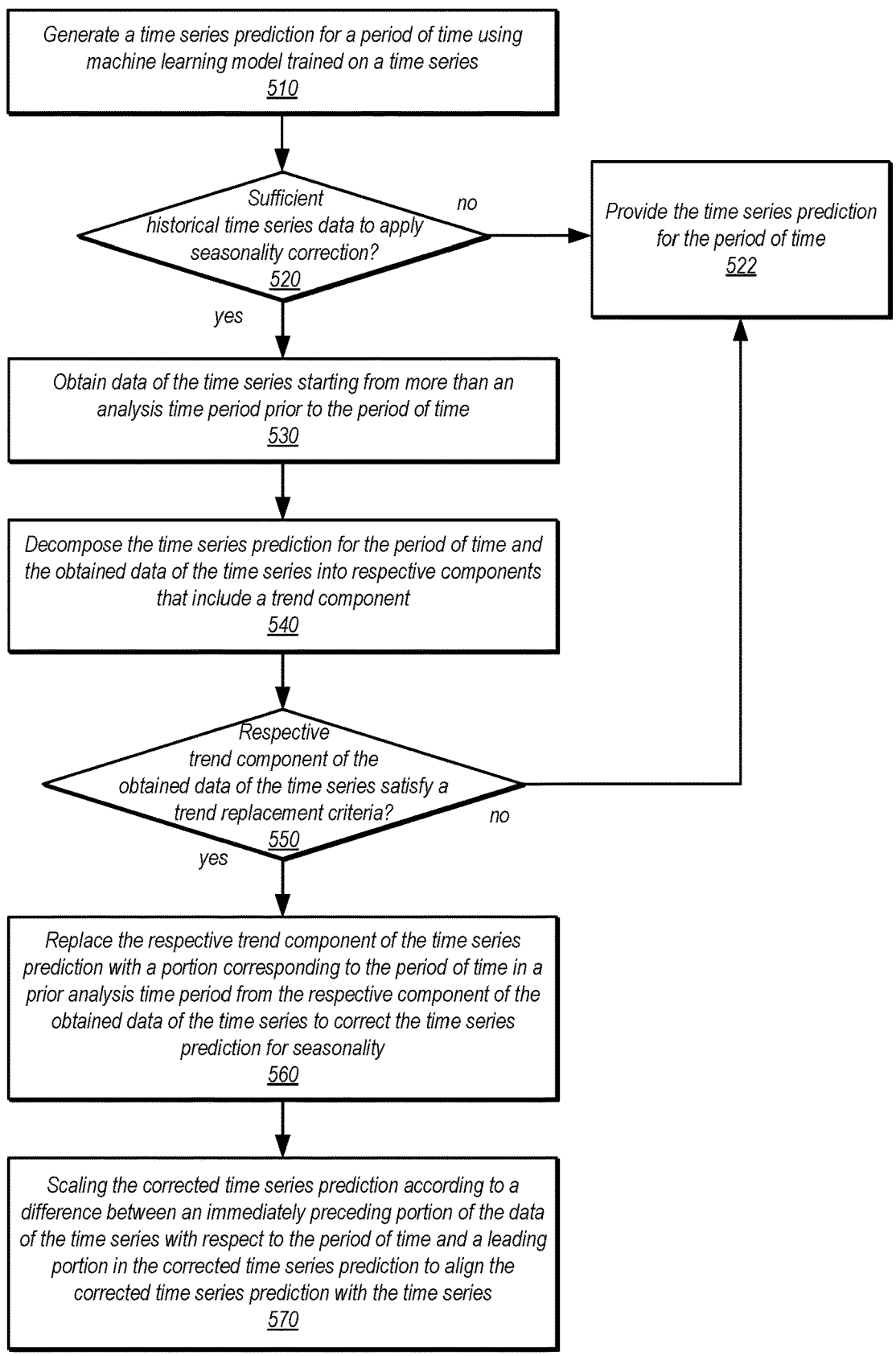
FIG. 5 illustrates a high-level flowchart of various methods and techniques to implement correcting time series predictions for seasonality with trends, according to some embodiments.

FIG. 5 illustrates a high-level flowchart of various methods and techniques to implement correcting time series predictions for seasonality with yearly trends, according to some embodiments. Various different systems and devices may implement the various methods and techniques described below, either singly or working together. Therefore, the above examples and or any other systems or devices referenced as performing the illustrated method, are not intended to be limiting as to other different components, modules, systems, or devices.

As indicated at 510, a time series prediction for a period of time may be generated using a machine learning model trained on a time series, in various embodiments. For example, a request may be received for the time series prediction via an interface of a time series prediction system. This request may, for example, be made by another system that implements features or performs operations dependent upon the time series prediction, which may be used as a forecast. In the example contact center management service, discussed above with regard to FIG. 2, these features or operations may include various call center staffing or computing resource allocation models, schedules, or plans in order to ensure that demand upon a contact center managed by the service is sufficiently resourced.

Different types of machine learning models may be used to generate the prediction. Deep neural networks (DNNs), Recurrent neural networks (RNNs), or other artificial neural networks may be used for instance, in some embodiments, which may have various features like Gated Recurrent Units (GRUs) or Long short-term memory (LTSM). These models may be trained using the time series. In some embodiments, the time series data used to train the model may include synthetic time series data generated according to the techniques discussed in detail below with regard to FIG. 6. The predictions provided by the machine learning model may be provided at different lengths and granularities. For example, in one embodiment the machine learning model may provide predictions for 15 minute intervals for a next 18 week period, resulting in 12,096 predicted data points.

As indicated at 520, a determination may be made as to whether sufficient historical time series data is available to apply a seasonality correction, in some embodiments. For instance, the amount of data points present in the time series at least a year (or other analysis time period) before the time period of prediction may have to exceed a threshold percentage (e.g., at least 15% of the total number of data points). In this way, noisy and sparse information in the time series is not used to correct for seasonality. If there is not sufficient historical time series data, then as indicated by the negative exit from 520, the time series prediction may be provided for the time period, as indicated at 522. This prediction is provided without a seasonality correction.

As indicated at 530, data of the time series starting from more than an analysis time period prior to the time period may be obtained (e.g., more than one year, quarter, month, etc.), in some embodiments. For an example where the analysis time period is a year, if the time period of prediction is Jan. 1, 2022, then the time series data from earlier than Jan. 1, 2021 may be obtained (in addition to the time series data up to the prediction time period, such as from Jan. 1, 2021 to Jan. 1, 2022). This data may be obtained from a data store (e.g., identified in the request for the time series prediction, in some embodiments.

As indicated at 540, the time series prediction for the period of time and the obtained data of the time series may be decomposed into respective components that include a trend component, in some embodiments. Note that other components may be generated as a result of decomposition, such as seasonal behavior and/or remainder or residual components. Different decomposition techniques may be performed. One example of a decomposition technique that may be performed is Seasonal and Trend decomposition using Loess (STL) which may estimate non-linear relationships and provide various seasonal components. For example, a decomposition using STL may produce the components as weekly components, including yearly trend, seasonal behavior, and residuals. Note that other decomposition techniques may be implemented and thus STL is provided as an example of decomposition and is not intended to be limiting as to other decomposition techniques that may include determining a trend component.

As indicated at 550, an evaluation of the trend component of the obtained time series data may be performed to determine whether a trend replacement criteria is satisfied.

Different types of evaluations may be performed. In some embodiments, an evaluation using an auto-correlation function may be used. The auto-correlation function may measure the linear relationship between an observation at time *t* and the observations at previous times. The auto-correlation function value of the trend may be determined at a an analysis time period (e.g., 365 days for a year analysis time period). This auto-correlation function value may then be compared with an auto-correlation function value threshold as the trend replacement criteria (e.g., an auto-correlation function value with an absolute value of 0.25 or above).

Another type of evaluation of the trend component may use the coefficient of determination to determine whether a trend replacement criteria is satisfied. In some embodiments, a regression model may be created and then the parameters of the model estimated to determine the coefficient of determination between corresponding trends leading up to or immediately preceding the time period of prediction for the time series prediction. For an example where the analysis time period is a year, if prediction starts at Jun. 1, 2021, then the evaluation of the trends from the obtained data of the time series in a period of time (e.g., 12 weeks) leading up to the prediction time and a corresponding period from a prior year may be compared (e.g., comparing periods of Mar. 1, 2021 through May 31, 2021 and Mar. 1, 2020 through May 31, 2020). The determined coefficient of determination may be compared with a coefficient determination threshold as the trend replacement criteria (e.g., an absolute value exceeding a threshold of 0.8 or 80%).

If the trend replacement criteria is not satisfied, then as indicated by the negative exit from 550, the time series prediction may be provided for the time period, as indicated at 522. This prediction is provided without a seasonality correction. If the trend replacement criteria is satisfied, then as indicated by the positive exit from 550, the respective trend component of the time series prediction may be replaced with a portion corresponding to the period of time in a prior analysis time period from the respective component of the obtained data of the time series to correct the time series prediction for seasonality. For example, this replacement component may be used to reconstitute the time series prediction using the replaced component along with other components produced by the decomposition to generate the corrected time series prediction.

As indicated at 570, in at least some embodiments, the corrected time series prediction may be scaled according to a difference between an immediately preceding portion of the data of the time series with respect to the period of time and a leading portion in the corrected time series prediction to align the corrected time series prediction with the time series, in some embodiments. For example, the individual data points may be scaled (e.g., multiplied) by the amount of median difference in the last 4 weeks and the first predicted 4 weeks.

The corrected time series prediction (with or without alignment) may be returned via an interface of the time series prediction system. The corrected time series prediction may be stored for future use or analysis in some embodiments.

As discussed above with regard to FIG. 1, insufficient time series data may prevent the application of various time series prediction techniques, including the time series prediction techniques that account for seasonality as discussed above. FIG. 6 illustrates a high-level flowchart of various methods and techniques to implement generating a synthetic time series for training a machine learning model for time series predictions, according to some embodiments. As indicated at 610, a least recent one analysis time period (e.g., year, quarter, month, etc.) of time series data may be obtained, in some embodiments. For an example where the analysis time period is a year, the oldest available year in a time series may be obtained. In other embodiments, other considerations may be given (e.g., to a year of time series data that includes a minimum portion of the overall data, like the 15% threshold discussed above with regard to element 520 of FIG. 5).

As indicated at 620, a number of copies of the least recent analysis time period of time series data may be concatenated to create a synthetic time series, in some embodiments. This synthetic time series may thus become X analysis time periods long according to the number (X) of copies concatenated. In some embodiments, the synthetic time series may be scaled to smooth transitions between the concatenated copies of the least recent analysis time period.

As indicated at 630, the synthetic time series may be modified according to the application of noise injection, in some embodiments. For example, noise injection may be performed by injecting a small amount of noise or outlier data into the time series as compared with the original time series using a Gaussian noise profile. In other embodiments, other noise profiles may be used. Such techniques may diversify the time series data in order to prevent the time series predictions from merely being a repetition of the analysis time periods in the time series model.

As indicated at 640, the synthetic time series may be modified according to one or more linear trends, in some embodiments. For example, a linear trend may be a pattern in data that shows the movement of a series to relatively higher or lower values over a period of time. The linear trend may be determined from historical data for the time series or may be provided as part of input to the time series prediction system (e.g., as various features or factors that drive changes in time series data). Injecting linear trends allow for the synthetic time series to train a machine learning model to incorporate the trend in predictions.

As indicated at 650, the synthetic time series may be stored for training a machine learning model to generate time series predictions, in some embodiment. For example, a data store location for the time series prediction system specific to particular account, user, client system or application, may be used so that the appropriate training data can later be retrieved for that account, user, or client system or application.

The methods described herein may in various embodiments be implemented by any combination of hardware and software. For example, in one embodiment, the methods may be implemented on or across one or more computer systems (e.g., a computer system as in FIG. 7) that includes one or more processors executing program instructions stored on one or more computer-readable storage media coupled to the processors. The program instructions may implement the functionality described herein (e.g., the functionality of various servers and other components that implement the network-based virtual computing resource provider described herein). The various methods as illustrated in the figures and described herein represent example embodiments of methods. The order of any method may be changed, and various elements may be added, reordered, combined, omitted, modified, etc.

Figure 7:
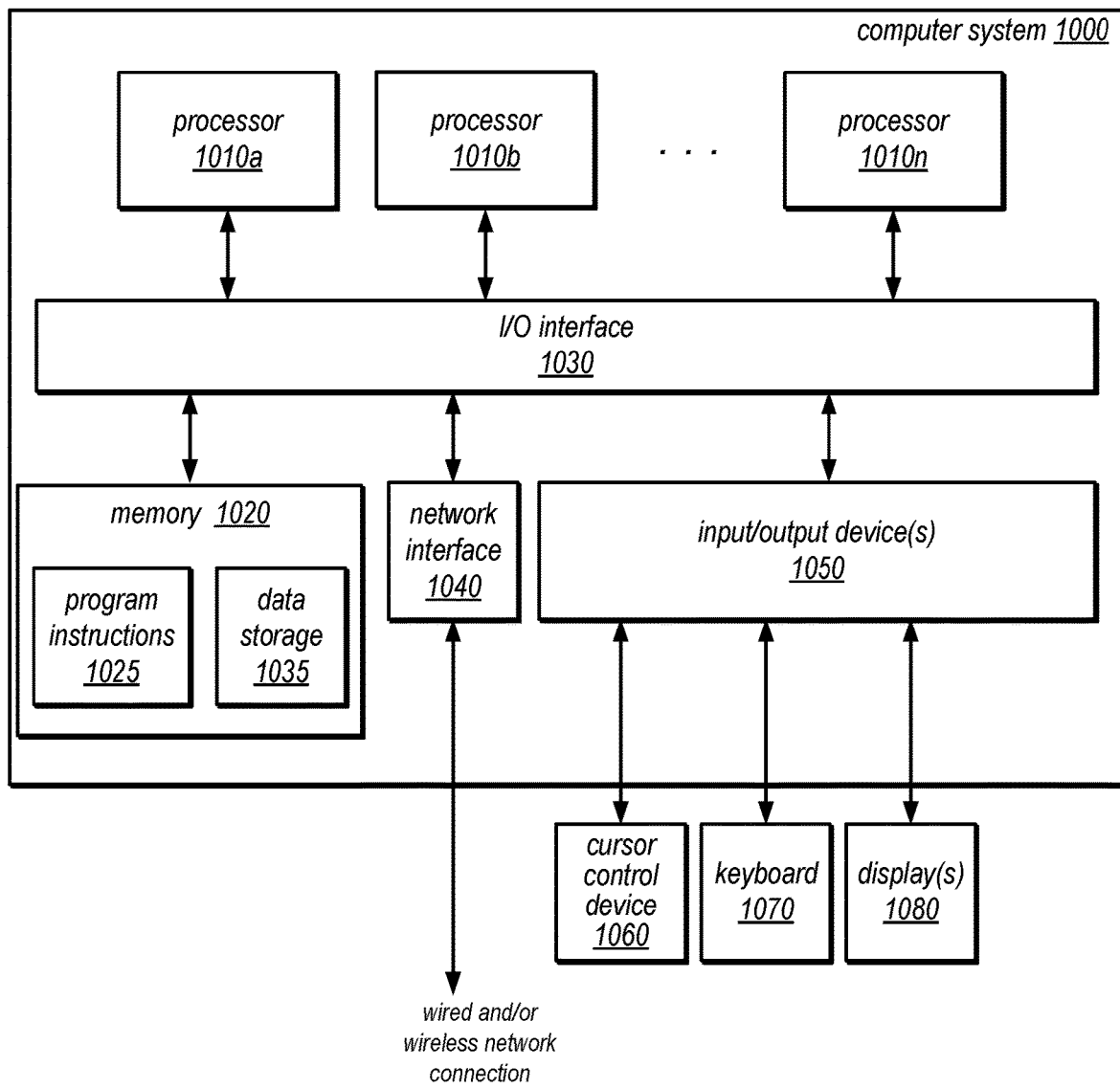
FIG. 7 illustrates an example system to implement the various methods, techniques, and systems described herein, according to some embodiments.

Embodiments of correcting time series predictions for seasonality with trends as described herein may be executed on one or more computer systems, which may interact with various other devices. One such computer system is illustrated by FIG. 7. In different embodiments, computer system 1000 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing device, computing node, compute node, or electronic device.

In the illustrated embodiment, computer system 1000 includes one or more processors 1010 coupled to a system memory 1020 via an input/output (I/O) interface 1030. Computer system 1000 further includes a network interface 1040 coupled to I/O interface 1030, and one or more input/output devices 1050, such as cursor control device 1060, keyboard 1070, and display(s) 1080. Display(s) 1080 may include standard computer monitor(s) and/or other display systems, technologies or devices. In at least some implementations, the input/output devices 1050 may also include a touch- or multi-touch enabled device such as a pad or tablet via which a user enters input via a stylus-type device and/or one or more digits. In some embodiments, it is contemplated that embodiments may be implemented using a single instance of computer system 1000, while in other embodiments multiple such systems, or multiple nodes making up computer system 1000, may host different portions or instances of embodiments. For example, in one embodiment some elements may be implemented via one or more nodes of computer system 1000 that are distinct from those nodes implementing other elements.

In various embodiments, computer system 1000 may be a uniprocessor system including one processor 1010, or a multiprocessor system including several processors 1010 (e.g., two, four, eight, or another suitable number). Processors 1010 may be any suitable processor capable of executing instructions. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA.

In some embodiments, at least one processor 1010 may be a graphics processing unit. A graphics processing unit or GPU may be considered a dedicated graphics-rendering device for a personal computer, workstation, game console or other computing or electronic device. Modern GPUs may be very efficient at manipulating and displaying computer graphics, and their highly parallel structure may make them more effective than typical CPUs for a range of complex graphical techniques. For example, a graphics processor may implement a number of graphics primitive operations in a way that makes executing them much faster than drawing directly to the screen with a host central processing unit (CPU). In various embodiments, graphics rendering may, at least in part, be implemented by program instructions that execute on one of, or parallel execution on two or more of, such GPUs. The GPU(s) may implement one or more application programmer interfaces (APIs) that permit programmers to invoke the functionality of the GPU(s). Suitable GPUs may be commercially available from vendors such as NVIDIA Corporation, ATI Technologies (AMD), and others.

System memory 1020 may store program instructions and/or data accessible by processor 1010. In various embodiments, system memory 1020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above are shown stored within system memory 1020 as program instructions 1025 and data storage 1035, respectively. In other embodiments, program instructions and/or data may be received, sent or stored upon different types of computer-accessible media or on similar media separate from system memory 1020 or computer system 1000. Generally speaking, a non-transitory, computer-readable storage medium may include storage media or memory media such as magnetic or optical media, e.g., disk or CD/DVD-ROM coupled to computer system 1000 via I/O interface 1030. Program instructions and data stored via a computer-readable medium may be transmitted by transmission media or signals such as electrical, electromagnetic, or digital signals, which may be conveyed via a communication medium such as a network and/or a wireless link, such as may be implemented via network interface 1040.

In one embodiment, I/O interface 1030 may coordinate I/O traffic between processor 1010, system memory 1020, and any peripheral devices in the device, including network interface 1040 or other peripheral interfaces, such as input/output devices 1050. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. In addition, in some embodiments some or all of the functionality of I/O interface 1030, such as an interface to system memory 1020, may be incorporated directly into processor 1010.

Network interface 1040 may allow data to be exchanged between computer system 1000 and other devices attached to a network, such as other computer systems, or between nodes of computer system 1000. In various embodiments, network interface 1040 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1050 may, in some embodiments, include one or more display terminals, keyboards, keypads, touchpads, scanning devices, voice or optical recognition devices, or any other devices suitable for entering or retrieving data by one or more computer system 1000. Multiple input/output devices 1050 may be present in computer system 1000 or may be distributed on various nodes of computer system 1000. In some embodiments, similar input/output devices may be separate from computer system 1000 and may interact with one or more nodes of computer system 1000 through a wired or wireless connection, such as over network interface 1040.

As shown in FIG. 7, memory 1020 may include program instructions 1025, that implement the various methods and techniques for correcting time series predictions for seasonality with yearly trends as described herein, and data storage 1035, comprising various data accessible by program instructions 1025. In one embodiment, program instructions 1025 may include software elements of embodiments as described herein and as illustrated in the Figures. Data storage 1035 may include data that may be used in embodiments. In other embodiments, other or different software elements and data may be included.

Those skilled in the art will appreciate that computer system 1000 is merely illustrative and is not intended to limit the scope of the techniques as described herein. In particular, the computer system and devices may include any combination of hardware or software that can perform the indicated functions, including a computer, personal computer system, desktop computer, laptop, notebook, or netbook computer, mainframe computer system, handheld computer, workstation, network computer, a camera, a set top box, a mobile device, network device, internet appliance, PDA, wireless phones, pagers, a consumer device, video game console, handheld video game device, application server, storage device, a peripheral device such as a switch, modem, router, or in general any type of computing or electronic device. Computer system 1000 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a non-transitory, computer-accessible medium separate from computer system 1000 may be transmitted to computer system 1000 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the present invention may be practiced with other computer system configurations.

It is noted that any of the distributed system embodiments described herein, or any of their components, may be implemented as one or more web services. In some embodiments, a network-based service may be implemented by a software and/or hardware system designed to support interoperable machine-to-machine interaction over a network. A network-based service may have an interface described in a machine-processable format, such as the Web Services Description Language (WSDL). Other systems may interact with the web service in a manner prescribed by the description of the network-based service's interface. For example, the network-based service may describe various operations that other systems may invoke, and may describe a particular application programming interface (API) to which other systems may be expected to conform when requesting the various operations.

In various embodiments, a network-based service may be requested or invoked through the use of a message that includes parameters and/or data associated with the network-based services request. Such a message may be formatted according to a particular markup language such as Extensible Markup Language (XML), and/or may be encapsulated using a protocol such as Simple Object Access Protocol (SOAP). To perform a web services request, a network-based services client may assemble a message including the request and convey the message to an addressable endpoint (e.g., a Uniform Resource Locator (URL)) corresponding to the web service, using an Internet-based application layer transfer protocol such as Hypertext Transfer Protocol (HTTP).

In some embodiments, web services may be implemented using Representational State Transfer ("RESTful") techniques rather than message-based techniques. For example, a web service implemented according to a RESTful technique may be invoked through parameters included within an HTTP method such as PUT, GET, or DELETE, rather than encapsulated within a SOAP message.

The various methods as illustrated in the FIGS. and described herein represent example embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A system, comprising:
    at least one processor; and
    a memory, storing program instructions that when executed by the at least one processor, cause the at least one processor to implement a time series prediction system, configured to:
        receive a request for a time series prediction for a period of time for a time series;
        generate an initial time series prediction for the period of time using a machine learning model trained on the time series;
        obtain data of the time series starting from more than an analysis time period prior to the period of time;
        decompose the time series prediction for the period of time and the obtained data of the time series into respective components comprising a trend component;
        evaluate the respective trend component of the obtained data of the time series to determine that a trend satisfies a trend replacement criteria;
        replace the respective trend component of the initial time series prediction with a portion corresponding to the period of time in a prior analysis time period from the respective trend component of the obtained data of the time series to generate a corrected time series prediction for seasonality; and
        return, via the interface, the corrected time series prediction.

2. The system of claim 1, wherein the time series prediction system is further configured to determine that a sufficient amount of the time series exists to apply seasonality correction.

3. The system of claim 1, wherein the time series prediction system is implemented as part of a contact center service offered by a provider network, and wherein the time series prediction predicts call volume and handling time for a contact center managed by the contact center service.

4. The system of claim 1, wherein the time series comprises a synthetic time series that is generated from a concatenated number of copies of an analysis time period of the time series that are modified according to Gaussian noise and one or more linear trends.

5. A method, comprising:
generating, by a time series prediction system, a time series prediction for a period of time using a machine learning model trained on a time series;
obtaining, by the time series prediction system, data of the time series starting from more than an analysis time period prior to the period of time;
decomposing, by the time series prediction system, the time series prediction for the period of time and the obtained data of the time series into respective components comprising a trend component;
evaluating, by the time series prediction system, the respective trend component of the obtained data of the time series to determine that a trend satisfies a trend replacement criteria; and
replacing, by the time series prediction system, the respective trend component of the time series prediction with a portion corresponding to the period of time in a prior analysis time period from the respective component of the obtained data of the time series to correct the time series prediction for seasonality.

6. The method of claim 5, further comprises determining that a sufficient amount of the time series exists to apply seasonality correction.

7. The method of claim 5, wherein evaluating the respective trend component of the obtained data of the time series to determine that the trend satisfies the trend replacement criteria comprises applying an auto-correlation function to the respective trend component of the obtained data to determine that an auto correlation function value determined from the respective trend component at the analysis time period is above a threshold correlation function value.

8. The method of claim 5, wherein evaluating the respective trend component of the obtained data of the time series to determine that the trend satisfies the trend replacement criteria comprises applying a regression model to determine a coefficient of determination between an earlier time period of the time series immediately preceding the period of time of the time series prediction and a corresponding time period one analysis time period prior to the earlier time period, wherein the coefficient of determination is determined to be above a threshold coefficient value.

9. The method of claim 5, further comprising:
receiving, via an interface of the time series prediction system, a request for a second time series prediction for a second period of time;
generating, by the time series prediction system, the second time series prediction for the second period of time using a second machine learning model trained on a second time series;
obtaining, by the time series prediction system, second data of the second time series starting from more than the analysis time period prior to the second period of time;
decomposing, by the time series prediction system, the second time series prediction for the second period of time and the second data of the time series into respective components comprising a trend component;
evaluating, by the time series prediction system, the respective trend component of the second data of the time series to determine that a trend does not satisfy the trend replacement criteria; and
returning, by the time series prediction system, the second time series prediction in response to the request.

10. The method of claim 5, wherein decomposing the second time series prediction for the second period of time and the second data of the time series into respective components comprising the trend component comprises applying a Seasonal and Trend decomposition using Loess (STL) produces the respective trend component and respective seasonal behavior components and remainder components.

11. The method of claim 5, further comprising scaling the corrected time series prediction according to a difference between an immediately preceding portion of the data of the time series with respect to the period of time and a leading portion in the corrected time series prediction to align the corrected time series prediction with the time series.

12. The method of claim 5, further comprising:
receiving, via an interface of the time series prediction system, a request for the time series prediction for the period of time; and
returning, via the interface of the time series prediction system, the corrected time series prediction in response to the request.

13. The method of claim 5, wherein the time series comprises a synthetic time series that is generated from a concatenated number of copies of the analysis time period of the time series that are modified according to applying noise injection and one or more linear trends.

14. One or more non-transitory, computer-readable storage media, storing program instructions that when executed on or across one or more computing devices cause the one or more computing devices to implement:
generating, by a time series prediction system, a time series prediction for a period of time using a machine learning model trained on a time series;
obtaining, by the time series prediction system, data of the time series starting from more than an analysis time period prior to the period of time;
decomposing, by the time series prediction system, the time series prediction for the period of time and the obtained data of the time series into respective components comprising a trend component;
evaluating, by the time series prediction system, the respective trend component of the obtained data of the time series to determine that a yearly trend satisfies a trend replacement criteria;
replacing, by the time series prediction system, the respective trend component of the time series prediction with a portion corresponding to the period of time in a prior analysis time period from the respective component of the obtained data of the time series to correct the time series prediction for seasonality; and
providing, via an interface of the time series prediction system, the corrected time series prediction.

15. The one or more non-transitory, computer-readable storage media of claim 14, storing further instructions that when executed on or across the one or more computing devices, cause the one or more computing devices to further implement determining that a sufficient amount of the time series exists to apply seasonality correction.

16. The one or more non-transitory, computer-readable storage media of claim 14, wherein, in evaluating the respective trend component of the obtained data of the time series to determine that the trend satisfies the trend replacement criteria, the program instructions cause the one or more computing devices to implement applying an auto-correlation function to the respective trend component of the obtained data to determine that an auto correlation function value determined from the respective trend component at a one analysis time period is above a threshold correlation function value.

17. The one or more non-transitory, computer-readable storage media of claim 14, wherein, in evaluating the respective trend component of the obtained data of the time series to determine that the trend satisfies the trend replacement criteria, the program instructions cause the one or more computing devices to implement applying a regression model to determine a coefficient of determination between an earlier time period of the time series immediately preceding the period of time of the time series prediction and a corresponding time period one analysis time prior to the earlier time period, wherein the coefficient of determination is determined to be above a threshold coefficient value.

18. The one or more non-transitory, computer-readable storage media of claim 14, storing further instructions that when executed on or across the one or more computing devices cause the one or more computing devices to implement scaling the corrected time series prediction according to a difference between an immediately preceding portion of the data of the time series with respect to the period of time and a leading portion in the corrected time series prediction to align the corrected time series prediction with the time series.

19. The one or more non-transitory, computer-readable storage media of claim 14, wherein the time series prediction system is implemented as part of a contact center service offered by a provider network, and wherein the time series prediction predicts call volume and handling time for a contact center managed by the contact center service.

20. The one or more non-transitory, computer-readable storage media of claim 14, wherein the time series comprises a synthetic time series that is generated from a concatenated number of copies of the analysis time period of the time series that are modified according to application of noise injection and one or more linear trends.

* * * * *